US008767263B2

(12) United States Patent
Obata (10) Patent No.: US 8,767,263 B2
(45) Date of Patent: Jul. 1, 2014

(54) IMAGE FORMING APPARATUS AND METHOD OF CONTROLLING SAME

(71) Applicant: Canon Kabushiki Kaisha, Tokyo (JP)

(72) Inventor: Naohiro Obata, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/718,191

(22) Filed: Dec. 18, 2012

(65) Prior Publication Data
US 2013/0108291 A1  May 2, 2013

Related U.S. Application Data

(63) Continuation of application No. 12/427,840, filed on Apr. 22, 2009, now Pat. No. 8,363,269.

(30) Foreign Application Priority Data

Apr. 25, 2008  (JP) .................................. 2008-116301
Apr. 10, 2009  (JP) .................................. 2009-096458

(51) Int. Cl.
  *H04N 1/60*  (2006.01)
(52) U.S. Cl.
  USPC ............. 358/1.9; 358/1.18; 358/3.28; 399/45
(58) Field of Classification Search
  USPC ............ 358/1.9, 1.15, 1.18, 3.28; 399/23, 45, 399/66, 82
  See application file for complete search history.

(56) References Cited

U.S. PATENT DOCUMENTS

| 3,757,036 A * | 9/1973 | Libbet et al. ................ 358/470 |
| 4,983,994 A | 1/1991 | Mori et al. |
| 5,502,477 A * | 3/1996 | Osada et al. ................ 347/176 |
| 5,633,670 A | 5/1997 | Kwak |
| 5,790,143 A * | 8/1998 | Takada et al. ................ 347/16 |
| 5,848,321 A * | 12/1998 | Roh et al. ................ 399/45 |
| 6,236,815 B1 | 5/2001 | Kaneko et al. |
| 6,271,930 B1 | 8/2001 | Yamazaki |
| 6,457,794 B1 * | 10/2002 | Tajika et al. ................ 347/11 |

(Continued)

FOREIGN PATENT DOCUMENTS

| JP | 02175178 A * | 7/1990 | ............... B41J 29/38 |
| JP | 07-210042 A | 8/1995 | |

(Continued)

OTHER PUBLICATIONS

Japanese Office Action dated Jul. 5, 2013, issued in corresponding Japanese Patent Application No. 2009-096458.

*Primary Examiner* — Kimberly A Williams
(74) *Attorney, Agent, or Firm* — Fitzpatrick, Cella, Harper & Scinto (57) ABSTRACT

In an image forming apparatus, a discrimination unit discriminates the type of printing medium conveyed to an image forming unit. A comparator compares the type of a printing medium that has been designated and the type of a printing medium that has been discriminated. A setting unit sets a second image forming condition in the image forming unit if it has been determined not to add identification information to image information in accordance with the type of printing medium designated and, moreover, the type of printing medium designated and the type of printing medium discriminated by the discrimination unit do not match. The second image forming condition is different from a first image forming condition that conforms to the type of printing medium discriminated by the discrimination unit.

18 Claims, 8 Drawing Sheets

(56) References Cited

U.S. PATENT DOCUMENTS

| | | |
|---|---|---|
| 6,633,736 B1 * | 10/2003 | Park .................... 399/66 |
| 6,970,663 B2 * | 11/2005 | Comstock et al. ........... 399/66 |
| 7,095,968 B2 | 8/2006 | Akita et al. |
| 7,298,982 B2 | 11/2007 | Akita et al. |
| 8,061,911 B2 | 11/2011 | Saida |
| 2001/0007619 A1 | 7/2001 | Kakutani |
| 2001/0017989 A1 | 8/2001 | Tamai et al. |
| 2002/0024575 A1 | 2/2002 | Sato |
| 2002/0051192 A1 | 5/2002 | Utsunomiya |
| 2002/0080227 A1 | 6/2002 | Ohta et al. |
| 2002/0140939 A1 | 10/2002 | Haines et al. |
| 2003/0137679 A1 | 7/2003 | Nakazawa et al. |
| 2004/0126125 A1 | 7/2004 | Yoda et al. |
| 2004/0141762 A1 | 7/2004 | Okamoto et al. |
| 2004/0141776 A1 * | 7/2004 | Sohmiya et al. ........... 399/309 |
| 2005/0013621 A1 | 1/2005 | Akita et al. |
| 2005/0058465 A1 | 3/2005 | Toyohara |
| 2005/0063723 A1 * | 3/2005 | Comstock et al. ........... 399/66 |
| 2006/0245772 A1 | 11/2006 | Akita et al. |
| 2006/0276946 A1 | 12/2006 | Kaneko et al. |
| 2007/0014581 A1 | 1/2007 | Suzuki et al. |
| 2007/0147862 A1 * | 6/2007 | Nakamura et al. ........... 399/45 |
| 2008/0008491 A1 | 1/2008 | Tao et al. |
| 2008/0069612 A1 * | 3/2008 | Nakamura et al. ........... 399/340 |
| 2008/0080011 A1 | 4/2008 | Hamura |
| 2008/0252909 A1 | 10/2008 | Honguh et al. |
| 2009/0003913 A1 | 1/2009 | Uchida |

FOREIGN PATENT DOCUMENTS

| | | |
|---|---|---|
| JP | 10-76735 | 3/1998 |
| JP | 2000-253229 | 9/2000 |
| JP | 2006-039464 A | 2/2006 |
| JP | 2007-267399 A | 10/2007 |

* cited by examiner

FIG. 8 even though the printing medium
IMAGE FORMING APPARATUS AND METHOD OF CONTROLLING SAME This is a continuation of U.S. patent application Ser. No. 12/427,840, filed Apr. 22, 2009, and allowed on Sep. 20, 2012.

BACKGROUND OF THE INVENTION

1. Field of the Invention

The present invention relates to an image forming apparatus for forming an image on a printing medium.

2. Description of the Related Art

The performance of various types of image forming apparatuses (such as color printers and color copiers) has been improved in recent years and images of higher quality can be formed. On the other hand, there is also the possibility that a malicious individual will utilize such an image forming apparatus that is capable of forming high-quality images. The reason is that such an image forming apparatus is capable of faithfully reproducing paper currencies, banknotes and securities, etc. This problem of counterfeiting is becoming more worrisome as the performance of image forming apparatuses improves.

The specification of Japanese Patent Laid-Open No. 10-76735 proposes a technique whereby an additional signal indicating an ID that represents the manufacturer of the image forming apparatus or the serial number of the image forming apparatus is added to a color signal as a measure for suppressing counterfeits and forgeries. Further, the specification of Japanese Patent Laid-Open No. 2000-253229 proposes an invention for extracting an additional signal from an input image and specifying the apparatus that formed the image based upon the additional signal extracted.

A dot pattern serving as the additional signal usually is added to the entire image. Further, the dot pattern is added only to the yellow plane in order to make it difficult for the pattern to be identified by the human eye. However, a yellow dot pattern added to an OHT (overhead transparency) sheet can readily be identified by the human eye. This is undesirable in terms of image quality. Further, since an OHT sheet has a paper quality much different from that of paper currency, banknotes and securities, a forgery can be discerned easily. For these reasons, there is little need to add a dot pattern to an OHT sheet. Japanese Patent Laid-Open No. 10-76735 proposes an invention in which a tracking pattern is not added if a printing medium designated by the user is an OHT sheet.

SUMMARY OF THE INVENTION

Thus, in accordance with the invention described in Japanese Patent Laid-Open No. 10-76735, a tracking pattern is not added in a case where the printing medium designated by the user is an OHT sheet. This is extremely effective. However, in a case where the printing medium actually fed through the apparatus is plain paper even though the printing medium designated by the user is an OHT sheet, the image will be printed on the plain paper without the addition of the tracking pattern. This would make it difficult to prevent forgeries and counterfeits in an appropriate manner.

Accordingly, the present invention has been devised in order to solve at least one problem among these and other problems. Other features will be understood from a reading of the entire specification.

For example, an image forming apparatus comprises an image forming unit, a determination unit, an addition unit, a discrimination unit and a setting unit. The image forming unit forms an image on a printing medium in accordance with image information. In accordance with the type of printing medium designated, the determination unit determines whether to add identification information to the image information. The addition unit adds identification to the image information. The discrimination unit discriminates the type of printing medium conveyed to the image forming unit. The setting unit sets a second image forming condition in the image forming unit if it has been determined not to add identification information to the image information in accordance with the type of printing medium designated and, moreover, the type of printing medium designated and the type of printing medium discriminated by the discrimination unit do not match. The second image forming condition is different from a first image forming condition that conforms to the type of printing medium discriminated by the discrimination unit.

Further features of the present invention will become apparent from the following description of exemplary embodiments with reference to the attached drawings.

DESCRIPTION OF THE EMBODIMENTS

Embodiments of the present invention will be illustrated below. The individual embodiments described below will be useful in order to understand various concepts of the present invention, such as broader, intermediate and narrower concepts thereof. Further, the technical scope of the present invention is determined by the scope of the claims and is not limited by the individual embodiments set forth below.

Figure 1:
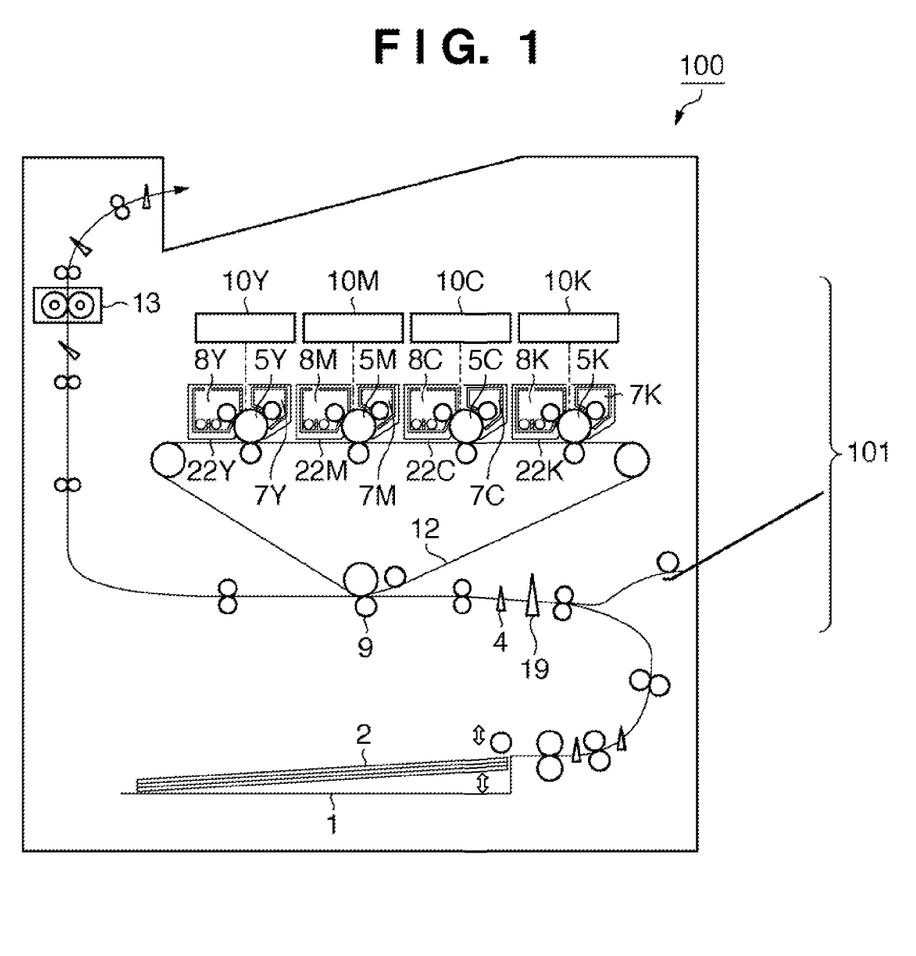
FIG. 1 is a schematic sectional view of an image forming apparatus according to an embodiment of the present invention.

FIG. 1 is a schematic sectional view of an image forming apparatus 100 according to a first embodiment of the present invention. Here a laser printer is adopted as an example of the image forming apparatus 100. However, the image forming method in the present invention may be any of an electrophotographic printing method, electrostatic printing method, magnetic printing method, ink-jet method, sublimation printing method or offset printing method.

An image forming unit 101 is one example of an image forming unit for forming an image on a printing medium in accordance with an input image signal (image information).

The image forming unit 101 mainly comprises photosensitive members 5Y, 5M, 5C, 5K; injection charging units 7Y, 7M, 7C, 7K serving as primary charging units; developing units 8Y, 8M, 8C, 8K; a toner cartridge; an intermediate transfer member 12; a feeding unit 1; a transfer unit 9; and a fixing unit 13. It should be noted that the photosensitive members, injection charging units and developing units are mounted on process cartridges 22Y, 22M, 22C, 22K, respectively, removably loaded in the main body of the image forming apparatus 100.

The photosensitive members 5Y, 5M, 5C, 5K are so-called photosensitive drums driven by transmission of driving power from driving motors, not shown. The injection charging units 7Y, 7M, 7C, 7K have respective sleeves and uniformly charge the surfaces of the corresponding photosensitive members 5Y, 5M, 5C, 5K, respectively. Scanner units 10Y, 10M, 10C, 10K irradiate the corresponding photosensitive members 5Y, 5M, 5C, 5K, respectively, with exposing light modulated in accordance with the input image signal and form electrostatic latent images on the photosensitive members 5Y, 5M, 5C, 5K.

The developing units 8Y, 8M, 8C, 8K accommodate yellow (Y), magenta (M), cyan (C) and black (K) developers, respectively, in toner cartridges. Furthermore, the developing units 8Y, 8M, 8C, 8K develop the electrostatic latent images, which have been formed on the photosensitive members, into toner images.

The intermediate transfer member 12 circulates while contacting the photosensitive members 5Y, 5M, 5C, 5K. As a result, the visible images (toner images) are transferred from the photosensitive members 5Y, 5M, 5C, 5K to the intermediate transfer member 12 by primary transfer. A secondary transfer roller of the transfer unit 9 transfers, by secondary transfer, the toner images of the respective colors superimposed on the intermediate transfer member 12 to a printing medium 2 conveyed from the feeding unit 1. Thus, the transfer unit 9 is one example of a transfer unit for transferring a toner image to a printing medium.

It should be noted that there are occasions where the printing medium 2 is also referred to as a "printing material", "printing medium", "form", "sheet" and "transfer paper". A prescribed transfer voltage is applied to the secondary transfer roller of the transfer unit 9 in order to promote the secondary transfer of the color visual image.

The fixing unit 13 is a device for fixing the as yet unfixed color visual image. The fixing unit 13 has a fixing roller for heating the printing medium 2, and a pressure roller for bringing the printing medium 2 into pressured contact with the fixing roller.

Provided in the conveyance path leading to the image forming unit are a registration sensor 19 for sensing the arrival of the printing medium 2 and a media sensor 4 for discriminating the type of printing medium 2 conveyed. For example, the media sensor 4 has a light-emitting element for irradiating the printing medium 2 with light from the back side, and a light-receiving element for detecting the amount of light that is transmitted through the printing medium 2. The media sensor 4 discriminates the type of printing medium by utilizing the characteristic that the amount of transmitted light differs depending upon the type of printing medium.

Figure 2:
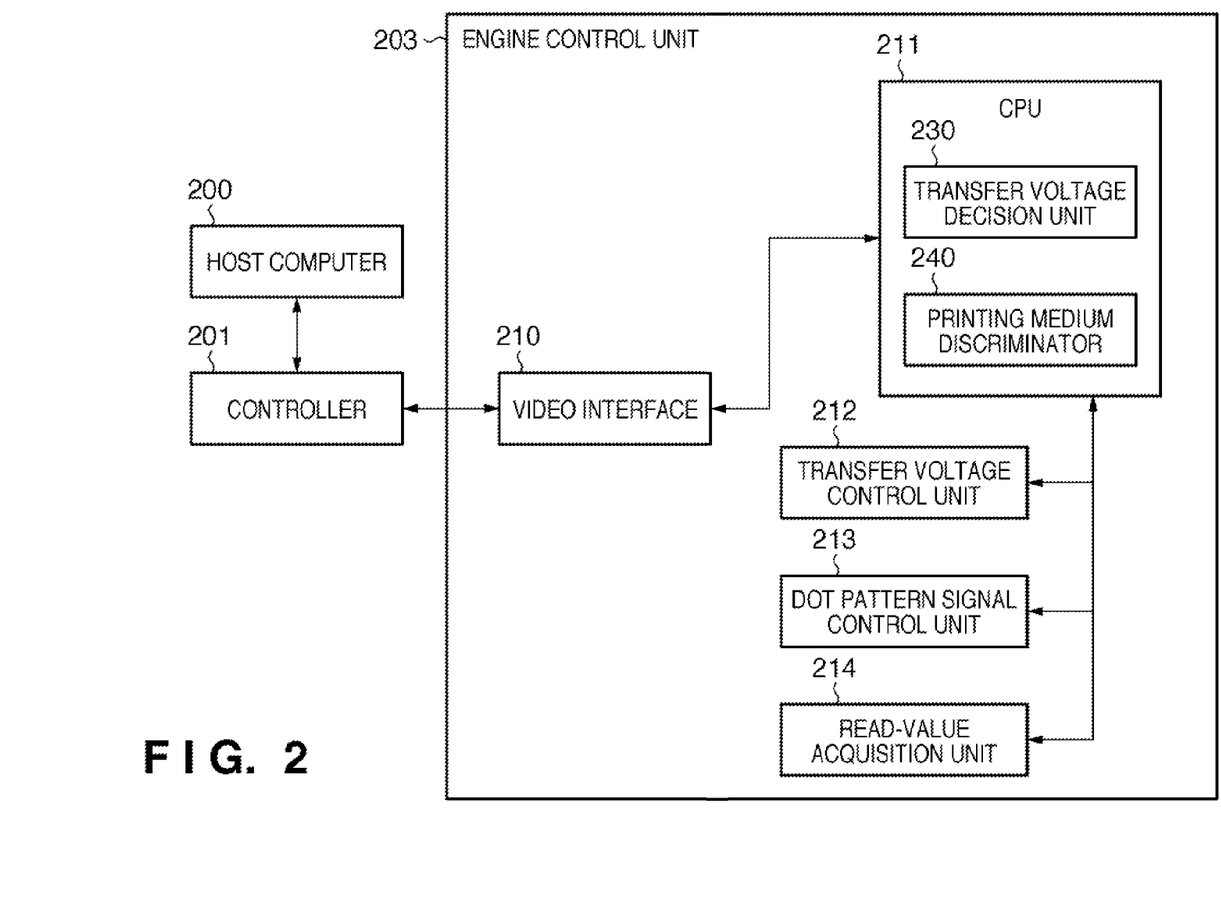
FIG. 2 is a block diagram of an image forming apparatus according to an embodiment.

FIG. 2 is a block diagram of the image forming apparatus according to the first embodiment. A controller 201 allows a host computer 200 and an engine control unit 203 to communicate with each other. The controller 201 receives image information and a print instruction from the host computer 200, analyzes the image information and converts it to bit data (an image signal). The controller 201 transmits a print scheduling command, a print starting command and the image signal to the engine control unit 203 on a per-printing-medium basis. The engine control unit 203 has a CPU 211 that receives the image signal and commands from the controller 201 via a video interface 210. It should be noted that instructions from the host computer 200 to the controller 201 also include a designation of type of printing medium (e.g., material property or paper quality, etc.).

The CPU 211 includes a transfer voltage decision unit 230 for deciding the value of transfer voltage, which is one image forming condition, and setting the value in a transfer voltage control unit 212, and a printing medium discrimination unit 240 for discriminating the type of printing medium actually fed. The transfer voltage decision unit 230 and printing medium discrimination unit 240 may be installed in the CPU 211 as hardware or may be functions implemented by executing software.

The printing medium discrimination unit 240 discriminates the type of printing medium in accordance with a read value that is output from a read-value acquisition unit 214. The read-value acquisition unit 214 reads a value of a signal output from the media sensor 4. The media sensor 4 outputs a signal, which conforms to the amount of transmission light, to the read-value acquisition unit 214. For example, the amount of light transmitted through an OHT sheet is greater than that transmitted through plain paper. Accordingly, the printing medium discrimination unit 240 compares the read value corresponding to the amount of transmitted light and a threshold value and determines that an OHT sheet is the type of printing medium if the read value exceeds the threshold value. On the other hand, if the read value is equal to or less than the threshold value, then the printing medium discrimination unit 240 determines that plain paper is the type of printing medium.

The transfer voltage control unit 212 applies the transfer voltage set by the transfer voltage decision unit 230 to the transfer roller of the transfer unit 9. It should be noted that the transfer voltage control unit 212 includes an inverter for generating positive and negative high-voltages for transfer. Thus, the transfer voltage control unit 212 is one example of an applying unit for applying transfer voltage to the transfer unit. Further, the transfer voltage decision unit 230 is one example of an adjusting unit for adjusting the transfer voltage in accordance with image forming conditions.

A dot pattern signal control unit 213 holds image data of an additional image (e.g., identification information such as a dot pattern) that is formed on the intermediate transfer member 12 in addition to the main image. The dot pattern is an image for tracking a forgery, by way of example. For instance, if the dot pattern is identification information of the image forming apparatus, the image forming apparatus can be specified from the image of forged printed matter. It should be noted that the pattern is not limited to identification information of an image forming apparatus and it will suffice if it is information capable of specifying an image forming apparatus that has been used in printing. This information may be information that includes the name of the computer or the name of the user of the computer that transmitted the image information to the image forming apparatus, by way of example. The dot pattern signal control unit 213 outputs the signal of the dot pattern to the CPU 211 in response to a request from the CPU 211. The CPU 211 adds this dot-pattern signal and the image signal that has been input from the controller 201 and outputs the resultant signal to a scanner unit.

Figure 3:
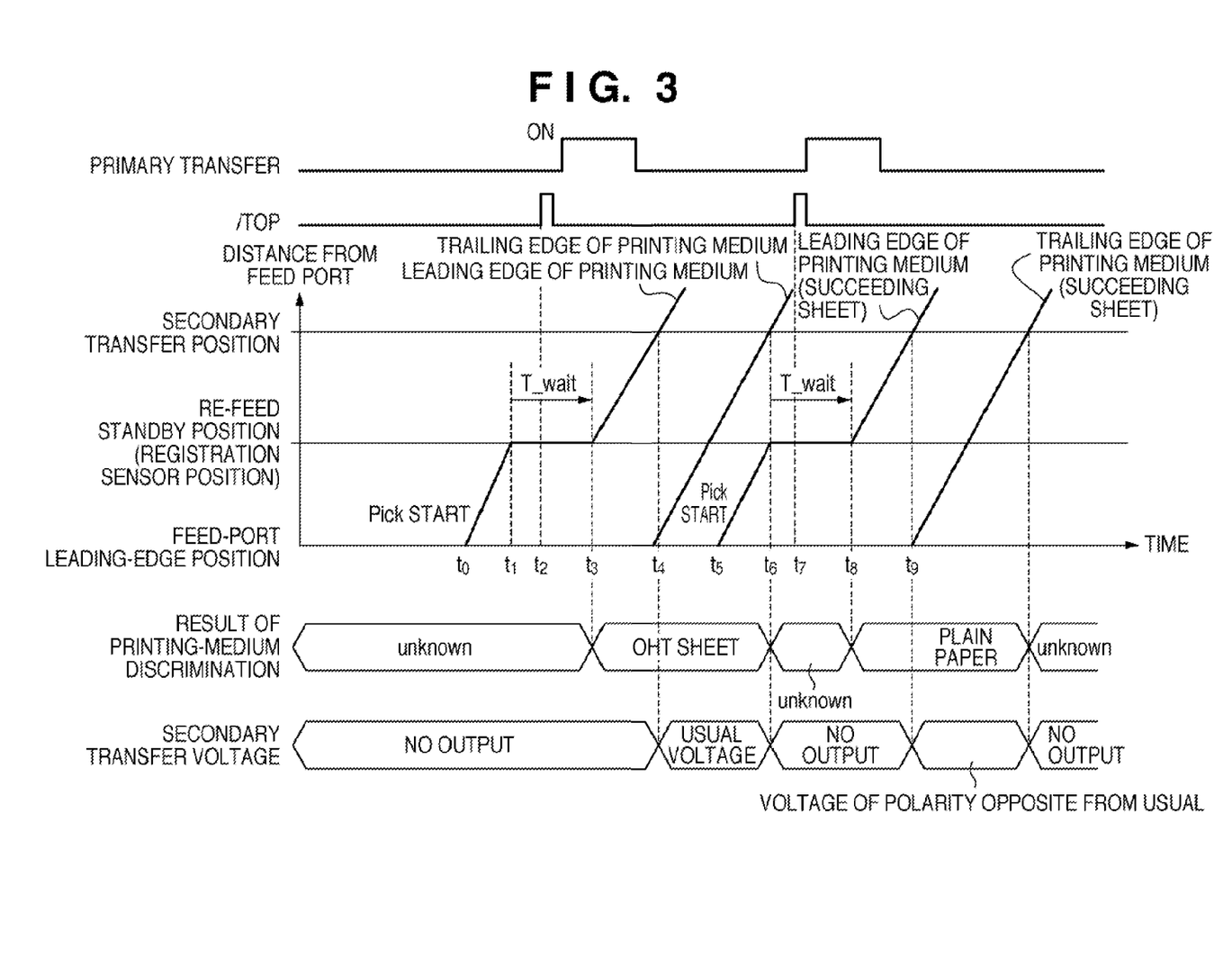
FIG. 3 is a diagram representing, in a time series, the conveyance operation of a fed printing medium until the printing medium reaches a secondary transfer position, and the manner in which image transfer is performed upon changing the setting of a secondary transfer voltage based upon result of discrimination of the type of printing medium.

FIG. 3 is a diagram representing, in a time series, the conveyance operation of a fed printing medium until the printing medium reaches a secondary transfer position, and the manner in which image transfer is performed upon changing the setting of a secondary transfer voltage based upon the result of discrimination of the type of printing medium.

At timing t0, the CPU 211 of the engine control unit 203 instructs the feeding unit 1 to start feeding the printing medium. When the registration sensor 19 senses the leading edge of the printing medium 2 at timing t1, the CPU 211 halts the conveyance of the printing medium temporarily. This is to synchronize the timing at which the toner image conveyed by the intermediate transfer member 12 arrives and the timing at which the printing medium arrives. The printing medium waits at a standby position form timings t1 to t3. It should be noted that in this embodiment, the period of time during which the printing medium is halted temporarily is utilized as a period of time during which the printing medium discrimination unit 240 discriminates the type of printing medium based upon the signal from the media sensor 4. For example, the time required for discrimination is T_wait [s]. The media sensor 4 is placed at a position (e.g., near the registration sensor) where the type of printing medium can be discriminated when the printing medium is waiting.

At timing t2, the CPU 211 outputs a /TOP signal, which is the reference timing for output of the image signal, to the controller 201. The controller 201 outputs the image signal to the engine control unit 203 with the /TOP signal being used as a reference. The engine control unit 203 drives the scanner unit in accordance with the image signal received. As a result, toner images are formed on respective ones of the four photosensitive members in the image forming unit and these are transferred to the intermediate transfer member 12 by primary transfer. It should be noted that the reason for outputting the /TOP signal while the printing medium discrimination unit 240 is discriminating the type of printing medium is that if the TOP signal were to be output after the result of discriminating the type of printing medium, image formation would not keep up with conveyance of the printing medium. By thus performing image formation on the intermediate transfer member 12 and discrimination of the type of printing medium in parallel, a decline in printing throughput is kept as low as possible.

Conveyance of the printing medium resumes at timing t3. Further, the type of printing medium is finalized from timing t3 onward. Here assume that the controller 201 has designated an OHT sheet and that the printing medium actually fed also is an OHT sheet.

At timing t4, the transfer voltage control unit 212 applies the transfer voltage set by the transfer voltage decision unit 230 to the transfer roller of the transfer unit 9. Since the designated type and the discriminated type match, the usual image forming condition (transfer voltage) is adopted. It should be noted that since the OHT sheet has been designated by the controller 201, the dot pattern signal control unit 213 does not output the dot pattern for tracking a forgery.

Feed of the printing medium for the second sheet thereof starts at timing t5, and conveyance of the printing medium is halted temporarily at timing t6. Here the printing medium discrimination unit 240 starts discriminating the type of printing medium. The /TOP signal is output at timing t7. Discrimination of the type of printing medium is completed and conveyance of the printing medium resumes at timing t8. Now, however, assume that plain paper is discriminated despite the fact that the OHT sheet has been designated.

At timing t9, the transfer voltage decision unit 230 sets the transfer voltage control unit 212 to an image forming condition (e.g., a voltage having a polarity opposite the usual polarity) that is different from the usual image forming condition.

The reason for doing this is that when plain paper is fed through the apparatus despite the fact that the OHT sheet has been designated, printing would be performed without adding the dot pattern for preventing forgery. Accordingly, as a result of the transfer voltage control unit 212 supplying the transfer roller with a voltage whose polarity is opposite the usual polarity, it can be so arranged that the density of the image formed will be different from usual. In other words, the image quality can be lowered. This should enable forgery and the like to be prevented. It should be noted that when the transfer voltage control unit 212 supplies the transfer roller with the voltage whose polarity is opposite the usual polarity, the amount of toner transferred to the printing medium can be reduced by a wide margin. That is, the density of the image falls below the usual density.

Figure 4:
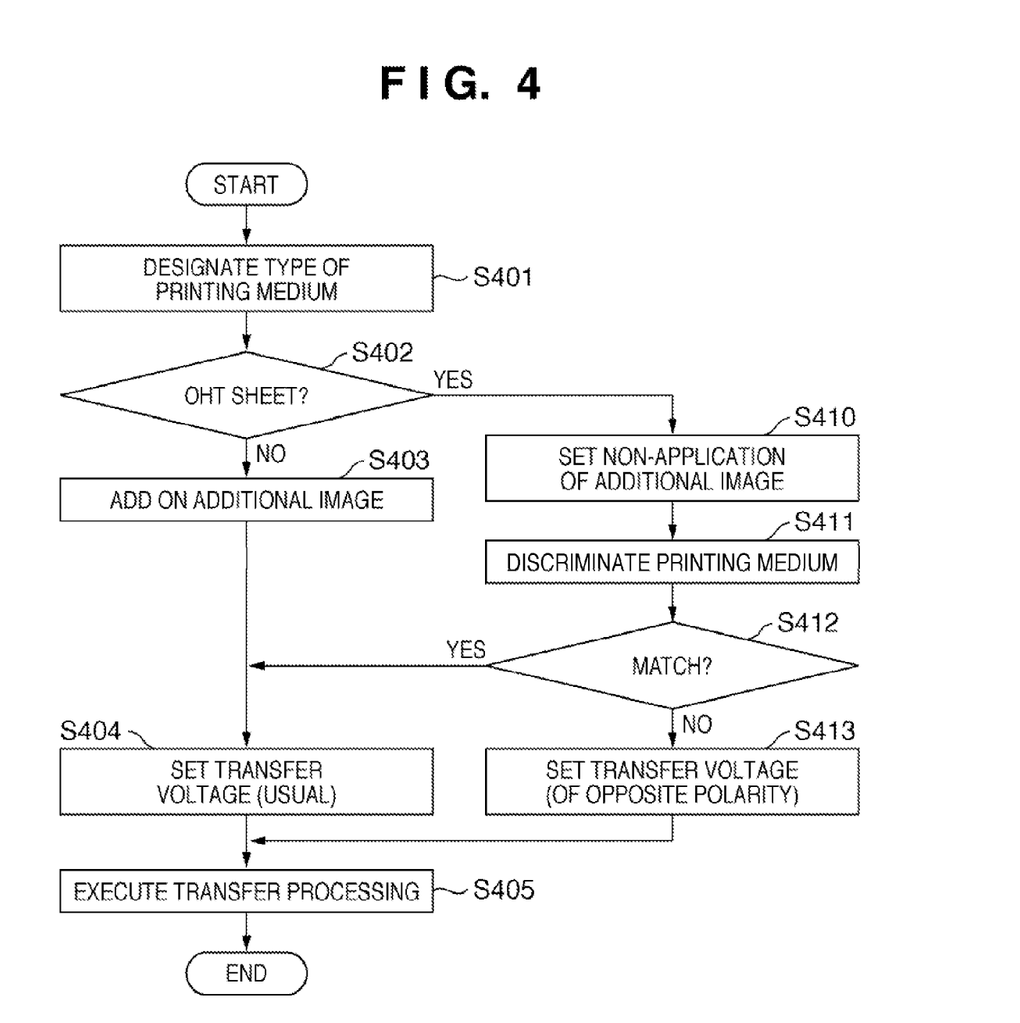
FIG. 4 is a flowchart illustrating a method of controlling an image forming apparatus according to an embodiment.

FIG. 4 is a flowchart illustrating a method of controlling an image forming apparatus according to the first embodiment. At step S401, the controller 201 designates the type of printing medium to the engine control unit 203 based upon a designation that has been input from the host computer 200 or from a control panel, etc. Accordingly, the controller 201 is one example of a designating unit for designating the type of printing medium.

At step S402, the CPU 211 of the engine control unit 203 determines whether the type of printing medium designated is a specific type (e.g., an OHT sheet). If the type is not the specific type, control proceeds to step S403. The determination processing at S402 is processing for determining whether an additional image (e.g., a yellow dot pattern) for preventing forgery is to be added to the main image. Accordingly, the CPU 211 is one example of a determination unit for determining whether an additional image is added to the input image signal in accordance with the type of printing medium designated.

At step S403, the CPU 211 instructs the dot pattern signal control unit 213 to add the additional image (e.g., a yellow dot pattern) for prevention of forgery to the main image. In response, the dot pattern signal control unit 213 outputs a signal for forming the dot pattern and adds this signal to the input image signal. As a result, an image to which the dot pattern has been added is formed on the intermediate transfer member 12. Accordingly, the dot pattern signal control unit 213 is one example of an addition unit for adding the signal of the additional image to the input image signal and supplying the resultant signal to the image forming unit.

The CPU 211 sets the usual image forming condition in the image forming unit at step S404. For example, the transfer voltage decision unit 230 of the CPU 211 sets the transfer voltage control unit 212 to a transfer voltage (the transfer voltage that prevails normally) that is capable of reproducing an image normally. The transfer voltage control unit 212 applies the set transfer voltage to the transfer roller of the transfer unit 9.

At step S405, the engine control unit 203 adjusts the conveyance timing of the printing medium and the transfer unit 9 transfers the toner image on the intermediate transfer member 12 to the conveyed printing medium 2 by secondary transfer.

If it is determined at step S402 that the designated type is the specific type (e.g., the OHT sheet), on the other hand, then control proceeds to step S410. Here the CPU 211 instructs the dot pattern signal control unit 213 not to add the additional image (e.g., a yellow dot pattern) to the main image. In response, the dot pattern signal control unit 213 halts the output of the signal that is for forming the dot pattern. Accordingly, an image to which the dot pattern has not been added is formed on the intermediate transfer member 12. It should be noted that the types of printing medium that can be discriminated by the media sensor 4 are plain paper, thick paper, thin paper and glossy paper, etc. The image forming condition is set in accordance with the type of printing medium discriminated by the media sensor 4. In this embodiment, the designated type is the specific type (e.g., the OHT sheet). However, in a case where the type of paper discriminated by the media sensor 4 is plain paper, the image forming condition is set to an image forming condition corresponding to plain paper.

At step S411, the printing medium discrimination unit 240 of the CPU 211 discriminates the type of conveyed printing medium using the media sensor 4. Thus, the printing medium discrimination unit 240 and media sensor 4 are an example of a discrimination unit for discriminating the type of printing medium conveyed to the image forming unit. For example, a sensor for imaging video of the surface of the printing medium and sensing the surface state, or a sensor for sensing the glossiness of the printing medium based upon light reflected from the printing medium, may be used as the sensor for discriminating the surface properties of the printing medium. Further, a sensor for sensing the amount of light transmitted through the printing medium can be used as a sensor for discriminating the thickness or weight of the printing medium.

At step S412, the CPU 211 compares the type of printing medium designated and the type of printing medium conveyed and determines whether the two match. If the two do match, control proceeds to step S404 described above. If the two do not match, on the other hand, then control proceeds to step S413. Thus, the CPU 211 is one example of a comparator for comparing the type of printing medium designated and the type of printing medium discriminated.

At step S413, the CPU 211 sets a second image forming condition, which is different from the first image forming condition usually applied, in the image forming unit. For example, the polarity of the transfer voltage included in the second image forming condition is opposite the polarity of the transfer voltage included in the first image forming condition. That is, the transfer voltage decision unit 230 sets the transfer voltage control unit 212 to a transfer voltage having a polarity opposite that of the normal transfer voltage set at step S404. As a result, the density of the image formed by applying the second image forming condition is lower than the density of the image formed by application of the first image forming condition. Thus, the CPU 211 and transfer voltage decision unit 230 are an example of a setting unit for setting the second image forming condition in the image forming unit if it has been determined not to add an additional image to the image signal and, moreover, the type of printing medium designated and the type of printing medium discriminated do not match. The second image forming condition is different from the first image forming condition, which conforms to the type of printing medium discriminated by the discrimination unit. When step S413 ends, control proceeds to step S405.

In accordance with this embodiment, the second image forming condition different from the usually applied first image forming condition is set in the image forming unit if the type of printing medium designated and the type of printing medium actually fed do not match. As a result, it is possible to prevent forgeries and the like in excellent fashion even in a case where the designated type of printing medium and the type of printing medium actually fed do not match.

Generally, since an OHT sheet is not suitable as a printing medium for counterfeiting, an additional image for preventing such counterfeiting is not transferred to the sheet. Conventionally, therefore, if plain paper is conveyed despite the fact that an OHT sheet has been designated, an image of paper currency, for example, can be printed on the plain paper without transfer of the additional image for preventing counterfeiting. By contrast, the present embodiment is such that when plain paper is conveyed despite the fact that an OHT sheet has been designated, the second image forming condition is set in the image forming unit, thereby making it possible to prevent forgery and counterfeiting, etc., in excellent fashion. The reason is that an image of diminished image quality is printed in this case.

Further, the density of an image formed by applying the second image forming condition is lower than the density of an image formed by applying the first image forming condition. As a result, the reproducibility of the original image declines, which should make it easier to determine whether the item has been forged. It should be noted that unauthorized use can be suppressed similarly not only with regard to forgery but also with regard to images protected by a copyright.

According to this embodiment, an electrophotographic method is adopted as one example. This means that a method of making the polarity of the transfer voltage opposite the normal polarity is adopted as the method of lowering image density. There are various methods of lowering image density and the present invention can adopt any of these methods.

In the first embodiment, a method of making the polarity of the transfer voltage opposite the normal polarity is adopted as the method of lowering image density. In a second embodiment described below, a method of lowering image density by making the transfer voltage lower than normal is described as another example.

Figure 5:
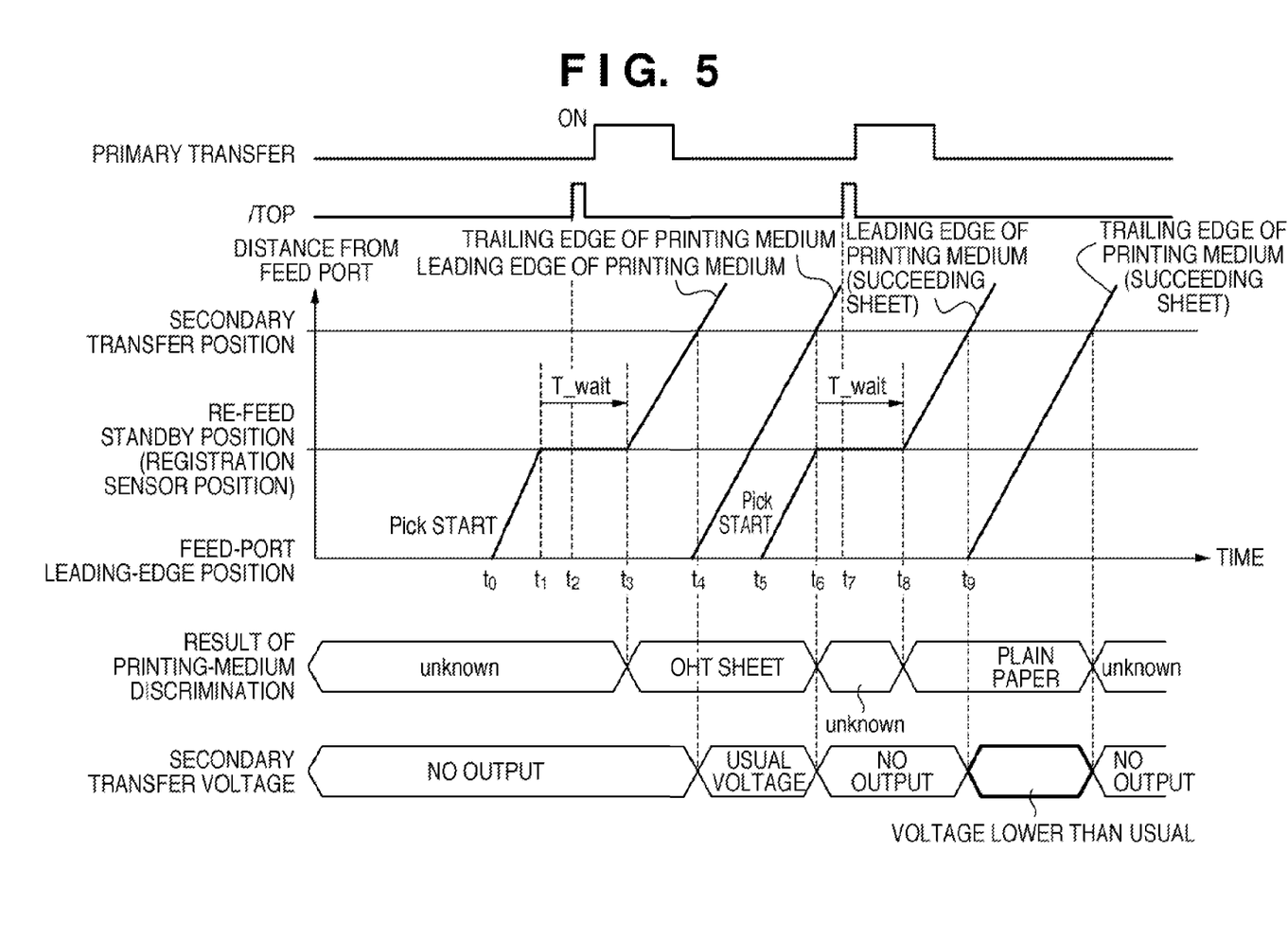
FIG. 5 is a timing chart illustrating the conveyance operation of a fed printing medium until the printing medium reaches a secondary transfer position.

FIG. 5 is a timing chart illustrating the conveyance operation of a fed printing medium until the printing medium reaches a secondary transfer position. As will be understood from a comparison of FIGS. 5 and 3, transfer voltage is changed to a value lower than the normal value with respect to a second sheet of a printing medium the discriminated type of which differs from a designated type.

Figure 6:
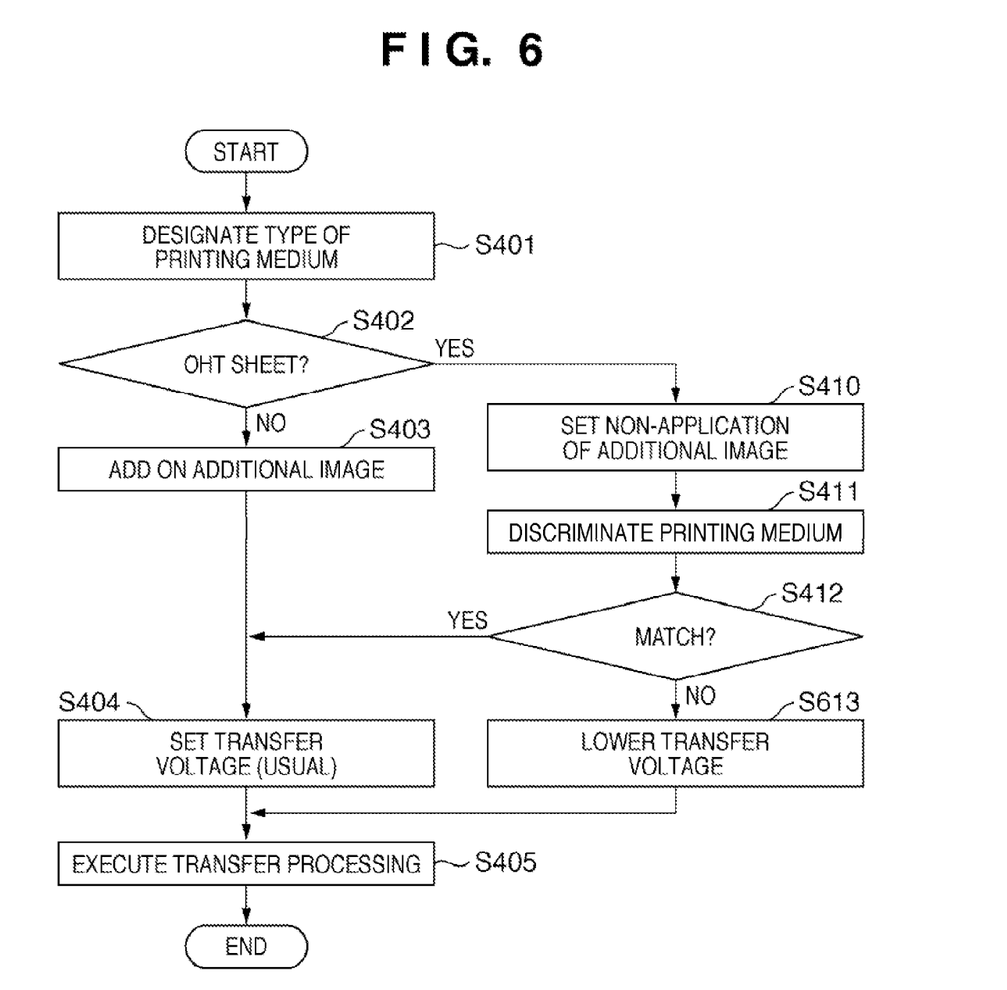
FIG. 6 is a flowchart illustrating a method of controlling an image forming apparatus according to an embodiment.

FIG. 6 is a flowchart illustrating a method of controlling an image forming apparatus according to the second embodiment. The description of processing is made more concise by designating steps similar to those in FIG. 4 by like step numbers. As will be understood from a comparison of FIGS. 4 and 6, step S413 is replaced with step S613.

At step S613, the CPU 211 sets the image forming unit to the second image forming condition different from the first image forming condition usually applied. For example, transfer voltage included in the second image forming condition is lower than transfer voltage included in the first image forming condition. That is, the transfer voltage decision unit 230 sets the transfer voltage control unit 212 to a transfer voltage the value of which is lower than that of the normal transfer voltage set at step S404. As a result, the density of the image formed by applying the second image forming condition is lower than that of the image formed by applying the first image forming condition. Control then proceeds to step S405.

In accordance with this embodiment, a transfer voltage lower than the normal transfer voltage is applied to the transfer unit 9 in a case where the type of printing medium designated and the type of printing medium actually fed do not agree. Image density, therefore, can be made lower than usual. As a result, the reproducibility of the original image declines, which should make it easier to determine whether the item has been forged. It should be noted that unauthorized use can be suppressed similarly not only with regard to forgery but also with regard to images protected by a copyright.

In the first embodiment, a method of making the polarity of the transfer voltage opposite the normal polarity is adopted as the method of lowering image density. In a third embodiment described below, a method of lowering image density by suspending application of transfer voltage is described as another example.

Figure 7:
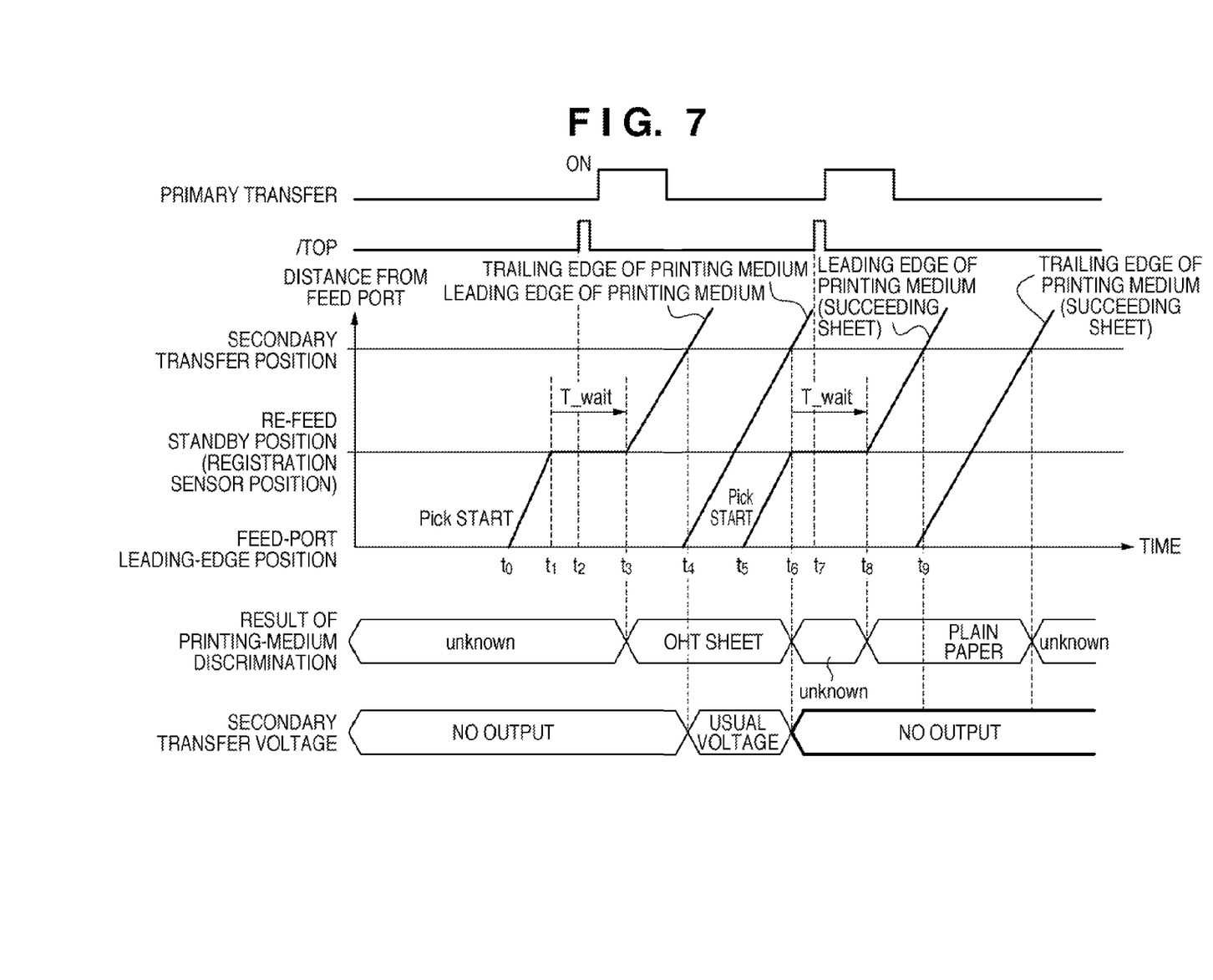
FIG. 7 is a timing chart illustrating the conveyance operation of a fed printing medium until the printing medium reaches a secondary transfer position.

FIG. 7 is a timing chart illustrating the conveyance operation of a fed printing medium until the printing medium reaches a secondary transfer position. As will be understood from a comparison of FIGS. 7 and 3, application of transfer voltage is suspended with respect to a second sheet of a printing medium the discriminated type of which differs from a designated type.

Figure 8:
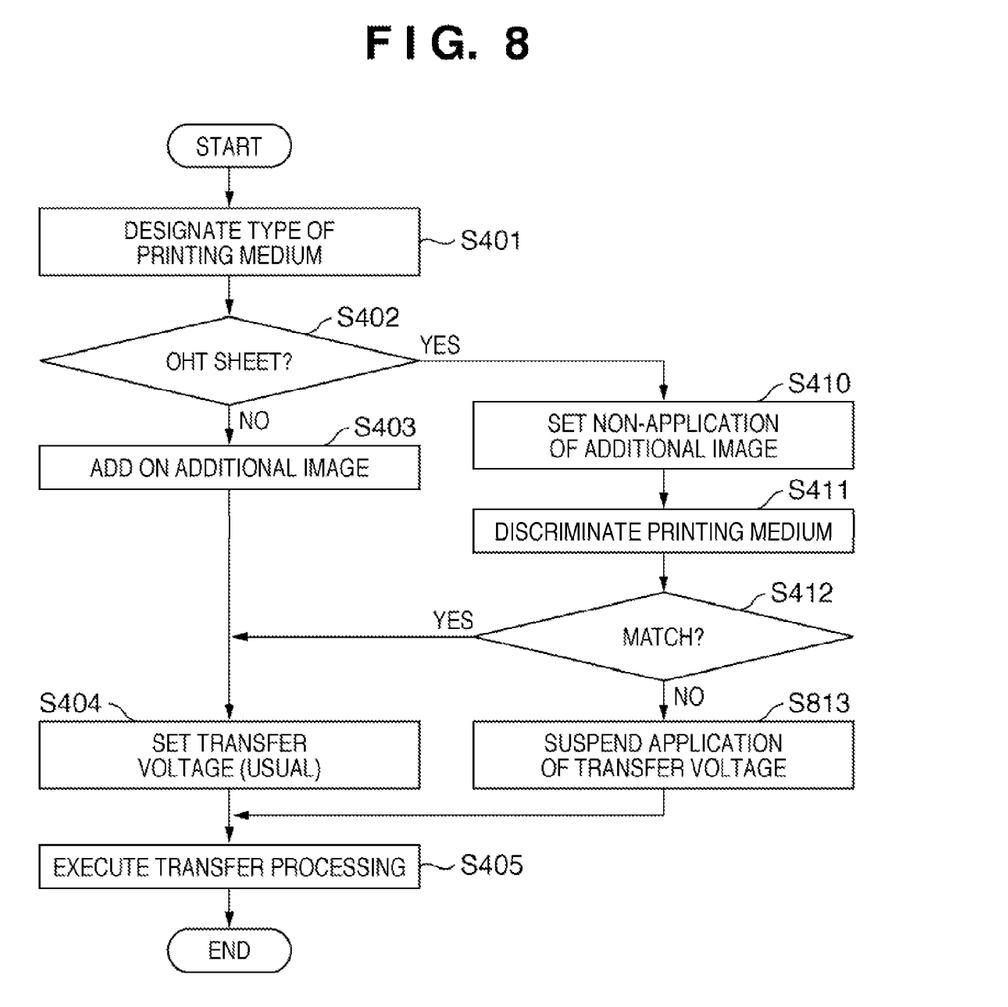
FIG. 8 is a flowchart illustrating a method of controlling an image forming apparatus according to an embodiment.

FIG. 8 is a flowchart illustrating a method of controlling an image forming apparatus according to the third embodiment. The description of processing is made more concise by designating steps similar to those in FIG. 4 by like step numbers. As will be understood from a comparison of FIGS. 4 and 8, step S413 is replaced with step S813.

At step S813, the CPU 211 sets the image forming unit to the second image forming condition different from the first image forming condition usually applied. For example, transfer voltage included in the second image forming condition is zero. This means that application of the transfer voltage is halted. That is, the transfer voltage decision unit 230 sets the transfer voltage control unit 212 in such a manner that the application of the transfer voltage is suspended. As a result, the density of the image formed by applying the second image forming condition is lower than that of the image formed by applying the first image forming condition. Control then proceeds to step S405.

In accordance with this embodiment, application of transfer voltage is suspended in a case where the type of printing medium designated and the type of printing medium actually fed do not agree. Image density, therefore, can be made lower than usual. As a result, the reproducibility of the original image declines, which should make it easier to determine whether the item has been forged. It should be noted that unauthorized use can be suppressed similarly not only with regard to forgery but also with regard to images protected by a copyright.

In each of the foregoing embodiments, an electrophotographic image forming apparatus is adopted. However, the present invention is applicable also to an image forming apparatus other than one using electrophotography. For example, even in an electrophotographic printing method, electrostatic printing method, magnetic printing method, ink-jet method, sublimation printing method and offset printing method, it will suffice to exercise control to lower image density in a case where the type of printing medium designated and type of printing medium actually fed do not match.

Further, it will suffice if the second image forming condition is one that is capable of preventing forgery, counterfeiting and unauthorized use of an image protected by copyright. For example, an image forming condition that makes image density much higher than normal may be adopted as the second image forming condition. From the standpoint of conserving toner, however, a method of lower image density is considered superior.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-116301, filed Apr. 25, 2008, and No. 2009-096458, filed Apr. 10, 2009, which are hereby incorporated by reference herein in their entirety.

What is claimed is:

1. An image forming apparatus comprising:
an image forming unit configured to form an image;
a feeding unit configured to feed a recording medium to the image forming unit; and
a control unit configured to control an image forming condition of the image forming unit such that a density of an image formed on the recording medium is increased to lower an image quality of the image when a type of the recording medium fed by the feeding unit is not a predesignated type,
wherein the image forming unit is further configured to form an image with added identification information when the predesignated type of recording medium is an OHT sheet and the recording medium fed by the feeding unit is not an OHT sheet, and to form an image without the identification information when the predesignated type of recording medium is an OHT sheet and the recording medium fed by the feeding unit is an OHT sheet.

2. The image forming apparatus according to claim 1, wherein the control unit is further configured to set an image forming condition which is different from an image forming condition corresponding to the predesignated type and an image forming condition corresponding to the type of the recording medium fed by the feeding unit to increase the density of the image formed on the recording medium fed by the feeding unit.

3. The image forming apparatus according to claim 1, wherein the identification information is information specifying the image forming apparatus.

4. The image forming apparatus according to claim 1, further comprising
an image carrier on which an image is formed,
wherein the recording medium is fed by the feeding unit after the image is formed on the image carrier.

5. A color image forming apparatus comprising:
a plurality of image forming units configured to respectively form different color images;
an image bearing member configured to bear the different color images formed by the plurality of image forming units;
a feeding unit configured to feed a recording medium on which the color images is transformed from the image bearing member; and
a control unit configured to control an image forming condition of the image forming unit such that a density of an image formed on the recording medium is increased to lower an image quality of the image when a type of the recording medium fed by the feeding unit is not a predesignated type,
wherein the image forming unit is further configured to form an image with added identification information when the predesignated type of recording medium is an OHT sheet and the recording medium fed by the feeding is not an OHT sheet, and to form an image without the identification information when the predesignated type of recording medium is an OHT sheet and the recording medium fed by the feeding is an OHT sheet.

6. The image forming apparatus according to claim 5, wherein the identification information is information specifying the image forming apparatus.

7. The image forming apparatus according to claim 5, wherein the recording medium is fed by the feeding unit after the image is formed on the image bearing member.

8. An image forming apparatus comprising:
an image forming unit configured to form an image according to image information;
a transfer unit configured to transfer an image to a recording medium,
a supplying unit configured to supply a transfer voltage to the transfer unit, and
an adding unit configured to add identification information to the image information in a case where an image is formed on a recording medium of a type that is not a specific type, and configured not to add the identification information to the image information in a case where an image is formed on a recording medium of a type that is the specific type,
wherein the supplying unit is further configured to supply a transfer voltage having a polarity that is opposite to a regular polarity of the transfer voltage used to transfer an image to a recording medium when an image is instructed to be formed on a recording medium of the specific type and a recording medium is not the recording medium of the specific type.

9. The image forming apparatus according to claim 8, further comprising:
a plurality of image forming units configured to respectively form different color images;
an image bearing member configured to bear the different color images formed by the plurality of image forming units; and
a plurality of transfer units configured to transfer an image to the recording medium.

10. The image forming apparatus according to claim 8, wherein the identification information is information specifying the image forming apparatus.

11. The image forming apparatus according to claim 8, wherein the identification information is information associated with a computer which sends the image information to the image forming apparatus.

12. The image forming apparatus according to claim 8, wherein the supplying unit is configured to lower a density of an image to be transferred to a recording medium by supplying the transfer voltage having a polarity that is opposite to the regular polarity.

13. The image forming apparatus according to claim 8, wherein the recording medium of the specific type is an OHT sheet.

14. An image forming apparatus comprising:
an image forming unit configured to form an image according to image information;
a feeding unit configured to feed a recording medium;
a control unit configured to control an image forming condition of the image forming unit according to a type of the recording medium; and
an adding unit configured to add identification information to the image information in a case where an image is formed on a recording medium of a type that is not a specific type, and configured not to add the identification information to the image information in a case where an image is formed on a recording medium of a type that is the specific type,
wherein the control unit is configured to set an image forming condition that is different from an image forming condition corresponding to a recording medium fed by the feeding unit in the case where the adding unit does not add the identification information and a type of the recording medium fed by the feeding unit is different from the specific type.

15. The image forming apparatus according to claim 14, wherein the identification information is information specifying the image forming apparatus.

16. The image forming apparatus according to claim 14, wherein the identification information is information associated with a computer which sends the image information to the image forming apparatus.

17. The image forming apparatus according to claim 14, wherein the control unit is configured to lower a density of an image to be transferred to a recording medium having a type that is different from the specific type by changing the image forming condition to be applied for the recording medium.

18. The image forming apparatus according to claim 14, wherein the recording medium of the specific type is an OHT sheet.

* * * * *